(12) United States Patent
Terakawa et al.

(10) Patent No.: US 9,096,214 B2
(45) Date of Patent: Aug. 4, 2015

(54) GEAR SHIFTING CONTROL DEVICE FOR HYBRID VEHICLE

(75) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 76 days.

(21) Appl. No.: 13/983,439

(22) PCT Filed: Feb. 21, 2012

(86) PCT No.: PCT/JP2012/054152
§ 371 (c)(1),
(2), (4) Date: Aug. 2, 2013

(87) PCT Pub. No.: WO2012/127965
PCT Pub. Date: Sep. 27, 2012

(65) Prior Publication Data
US 2013/0304337 A1    Nov. 14, 2013

(30) Foreign Application Priority Data

Mar. 23, 2011 (JP) ................................. 2011-064758

(51) Int. Cl.
*G06F 7/00* (2006.01)
*G06F 17/00* (2006.01)
(Continued)

(52) U.S. Cl.
CPC ............... *B60W 10/10* (2013.01); *B60W 10/02* (2013.01); *B60W 10/06* (2013.01); *B60W 10/08* (2013.01);
(Continued)

(58) Field of Classification Search
CPC ..... B60W 10/06; B60W 10/08; B60W 10/10; F16H 2306/24
USPC .................. 701/58, 51, 52, 56, 61, 64, 67, 68
See application file for complete search history.

(56) References Cited

U.S. PATENT DOCUMENTS

| 4,986,396 A | 1/1991 | Morimoto |
| 2005/0126321 A1* | 6/2005 | Ochi et al. ...................... 74/335 |

FOREIGN PATENT DOCUMENTS

| EP | 1411262 A2 | 4/2004 |
| EP | 1559923 A1 * | 8/2005 |

(Continued)

OTHER PUBLICATIONS

International Search Report (PCT/ISA/210) issued on May 22, 2012, by the Japanese Patent Office as the International Searching Authority for International Application No. PCT/JP2012/054152.

(Continued)

*Primary Examiner* — Imran Mustafa
(74) *Attorney, Agent, or Firm* — Buchanan Ingersoll & Rooney PC

(57) ABSTRACT

The gear shifting control device comprises a speed change operation completion detecting portion, a rotation difference judging portion for judging whether or not the absolute difference between the engine rotation speed and the input rotation speed exceeds a predetermined value and a clutch torque—operating amount correcting portion which replaces the clutch torque corresponding to the clutch actuator operating amount corresponding to the target clutch torque with a presumed clutch torque. Thus the correction accuracy for the clutch actuator operating amount can be improved by learning a speed change state by extracting a suitable state for learning.

9 Claims, 8 Drawing Sheets

(51) Int. Cl.
  G06F 19/00    (2011.01)
  B60W 10/10    (2012.01)
  F02D 29/02    (2006.01)
  B60W 20/00    (2006.01)
  B60W 10/02    (2006.01)
  B60W 10/06    (2006.01)
  B60W 10/08    (2006.01)
  B60W 30/19    (2012.01)
  F16D 48/06    (2006.01)
  B60W 10/11    (2012.01)
  B60W 50/00    (2006.01)

(52) U.S. Cl.
  CPC .............. *B60W 10/11* (2013.01); *B60W 20/108* (2013.01); *B60W 30/19* (2013.01); *F02D 29/02* (2013.01); *F16D 48/06* (2013.01); *B60W 2050/0088* (2013.01); *B60W 2710/027* (2013.01); *F16D 2500/1024* (2013.01); *F16D 2500/308* (2013.01); *F16D 2500/30406* (2013.01); *F16D 2500/30425* (2013.01); *F16D 2500/50236* (2013.01); *F16D 2500/70605* (2013.01); *Y02T 10/6286* (2013.01)

(56) References Cited

FOREIGN PATENT DOCUMENTS

| | | |
|---|---|---|
| EP | 2101074 A2 | 9/2009 |
| JP | 1-120433 A | 5/1989 |
| JP | 2004-138176 A | 5/2004 |
| JP | 2004-176894 A | 6/2004 |
| JP | 2005-214331 A | 8/2005 |
| JP | 2009-222068 A | 10/2009 |
| JP | 2010-143365 A | 7/2010 |
| JP | 2010-202153 A | 9/2010 |

OTHER PUBLICATIONS

U.S. Appl. No. 13/983,517, filed Aug. 2, 2013, Terakawa et al.
U.S. Appl. No. 13/983,479, filed Aug. 2, 2013, Terakawa et al.

* cited by examiner

GEAR SHIFTING CONTROL DEVICE FOR HYBRID VEHICLE

TECHNICAL FIELD

This invention relates to a gear shifting control device for a hybrid vehicle provided with an engine and a motor/generator (generating a driving force from an electric power accumulated in the battery, which is transmitted to a drive wheel and regenerating the electric power by being driven by the drive wheel upon regeneration operation), and an automated clutch device, wherein a gear shifting control device suitably controls clutch torque by learning an operating amount of a clutch actuator upon clutch engagement operation.

BACKGROUND OF THE TECHNOLOGY

Conventionally, in a vehicle having an internal combustion engine (engine) as a source of driving force, an automated manual transmission (hereinafter referred to as an AMT) has been known, wherein actuators are provided in an existing manual transmission for automatically operating a series of gear shifting operations such as clutch engagement/disengagement, gear shifting, gear selecting, in response to an intension or request of an operator of the vehicle or depending on a vehicle running state. In clutch operation of the AMT, the clutch is controlled by converting the clutch torque required depending on the vehicle performance characteristics into a clutch actuator operating amount (operating amount of the clutch actuator). Upon shipping of the vehicle, the relationship between the clutch torque and the clutch actuator operating amount is statically obtained based on a cushioning performance of the clutch disc or the like. However, under a vehicle actually running state, other dynamic variable factors largely influence on the relationship between the clutch torque and the clutch actuator operating amount. Such influencing dynamic variable factors are for example, abrasion of clutch facing, changes of the coefficient of friction ($\mu$) due to generated heat and the aged deterioration.

As the relationship between the clutch torque and the clutch actuator operating amount varies, an intended clutch engagement/disengagement operation upon gear shifting cannot be carried out timely in case of AMT vehicle. In more detail, when the clutch disengaged state exceeds the intended time, it may occur a situation that the engine torque is not transmitted to the vehicle wheels during the clutch disengaged operation, the operator of the vehicle feels stall of the vehicle. Further, when the clutch disengaged operation continues for a longer period of time, the engine which receives no load will excessively revolve, which may lead to an excess shifting shock due to a great difference between the engine rpm (revolution per minute) and input shaft rpm of the transmission upon clutch engagement operation. Accordingly, a technology has been proposed in, for example, a Patent Document 1 that the clutch torque map which determines the relationship between the clutch torque and the clutch actuator operating amount is corrected by learning the relationship therebetween properly when appropriated. According to the proposed technology in the Patent Document 1, the learning is performed at the time of vehicle starting where a clutch engagement/disengagement operation is carried out. When the vehicle starts, the rpm of the input shaft of the transmission is approximately zero (0) and accordingly, an always stable relationship between the clutch torque and the clutch actuator operating amount can be obtained. The relationship is corrected based on the obtained data to suitably set the clutch disengagement time to avoid stalling feeling for the operator of the vehicle and shifting shock due to the excessive increase of engine rpm.

DOCUMENT LIST OF STATE OF ART

Patent Document

Patent Document 1: JP2005-214331 A

DISCLOSURE OF INVENTION

Problems to be Solved

However, when applying the technology disclosed in the Patent Document 1 to a parallel type hybrid vehicle which includes both the internal combustion engine and the motor/generator and which starts the vehicle only by the motor/generator, the clutch actuator operating amount cannot be learned at the time of vehicle starting because no clutch engagement operation of the clutch device is needed for such starting mode. Further, if the clutch actuator operating amount is tried to be learned at a normal shifting operation other than the starting time, the time for the half-clutch state, which is a factor of learning of the operating amount of the clutch actuator, is too short to learn. Therefore, the opportunity for learning has been largely decreased and the correction accuracy for the relationship between the clutch torque and the clutch actuator operating amount may become worse.

Generally, in a hybrid vehicle, the clutch device is controlled not to give any stalling feeling by assisting the drive force by the motor/generator upon clutch disengagement operation during the vehicle running with engine. However, if the clutch disengaged time exceeds an intended time due to the inaccurate correction of the clutch torque and the clutch actuator operating amount, the timing between the clutch disengagement and assisting of motor/generator is not matched, the stalling feeling occurs and a shifting shock due to excessive rise of engine rpm may occur.

The present invention was made in consideration with the above problems and the object of the invention is to provide a gear shifting control device which can improve correction accuracy of the clutch actuator operating amount by learning the clutch actuator operating amount by extracting a shifting state suitable for learning the clutch actuator operating amount under various shifting states.

Means for Solving the Problem

The gear shifting control device for a hybrid vehicle includes an automated manual transmission which transmits a rotation of an input shaft adapted to be rotated by an engine torque outputted from an engine mounted on the hybrid vehicle to an output shaft rotatably connected to a drive wheel of the vehicle by changing a speed of the rotation from one speed change ratio to another speed change ratio when an engine rotation speed of the engine goes over each speed change performance line prepared per each speed change ratio for a plurality of speed change stages, a clutch for engaging the output shaft of the engine with the input shaft of the automated manual transmission or disengaging the output shaft of the engine from the input shaft of the automated manual transmission and controlling a clutch torque transmitted to the input shaft of the automated manual transmission from the output shaft of the engine under an engagement state therebetween to be a target clutch torque by operation of a clutch actuator, a clutch torque—operating amount memory portion for memorizing a corresponding relationship between a clutch actuator operating amount of the clutch actuator which controls the clutch torque of the clutch and the clutch torque, a clutch control portion for controlling the clutch torque to the target clutch torque by obtaining the clutch actuator operating amount of the clutch actuator which corresponds to a predetermined target clutch torque from the clutch torque-operating amount memory portion and operating the clutch actuator by the clutch actuator operating amount, an engine rotation speed detecting portion for detecting the engine rotation speed of the engine, an engine output control operating amount detecting portion for detecting an engine operating amount of an engine output control portion for controlling an output of the engine, an engine torque detecting portion for calculating an engine torque from the engine operating amount of the engine output control portion detected by the engine output control operating amount detecting portion and the engine rotation speed detected by the engine rotation speed detecting portion based on a relationship between the engine rotation speed and the engine torque at each engine operating amount of the engine output control portion, a presumed clutch torque calculating portion for calculating a presumed clutch torque by subtracting an inertia torque which is obtained by multiplying a rotation inertia moment with an acceleration speed of the engine rotation speed from the engine torque calculated from the engine output control operating amount and the engine rotation speed by the engine torque detecting portion when the clutch control portion operates the clutch actuator to operate the clutch actuator operating amount corresponding to the target clutch torque, a corresponding relationship correcting portion for correcting a corresponding relationship between the clutch actuator operating amount memorized in the clutch torque—operating amount memory portion and the clutch torque by learning the relationship between the presumed clutch torque calculated by the presumed clutch torque calculating portion and the clutch actuator operating amount when the clutch actuator is operated, an input shaft rotation speed detecting portion for detecting an input shaft rotation speed of the input shaft of the automated manual transmission and a motor rotatably connected to the input shaft or output shaft of the automated manual transmission. The corresponding relationship correcting portion includes a speed change operation completion detecting portion for detecting that the speed change operation is completed upon speed change operation of the automated manual transmission, a rotation difference judging portion for judging that an absolute difference between the engine rotation speed and the input shaft rotation speed of the automated manual transmission is equal to or more than a predetermined value under the clutch being engaged and a clutch torque-operating amount correcting portion for replacing a value of clutch torque corresponding to the clutch actuator operating amount which corresponds to the target clutch torque operated by the clutch actuator by the clutch control portion with the presumed clutch torque calculated by the presumed clutch torque calculating portion.

BRIEF EXPLANATION OF ATTACHED DRAWINGS

THE EMBODIMENTS FOR IMPLEMENTING THE INVENTION

Figure 1:
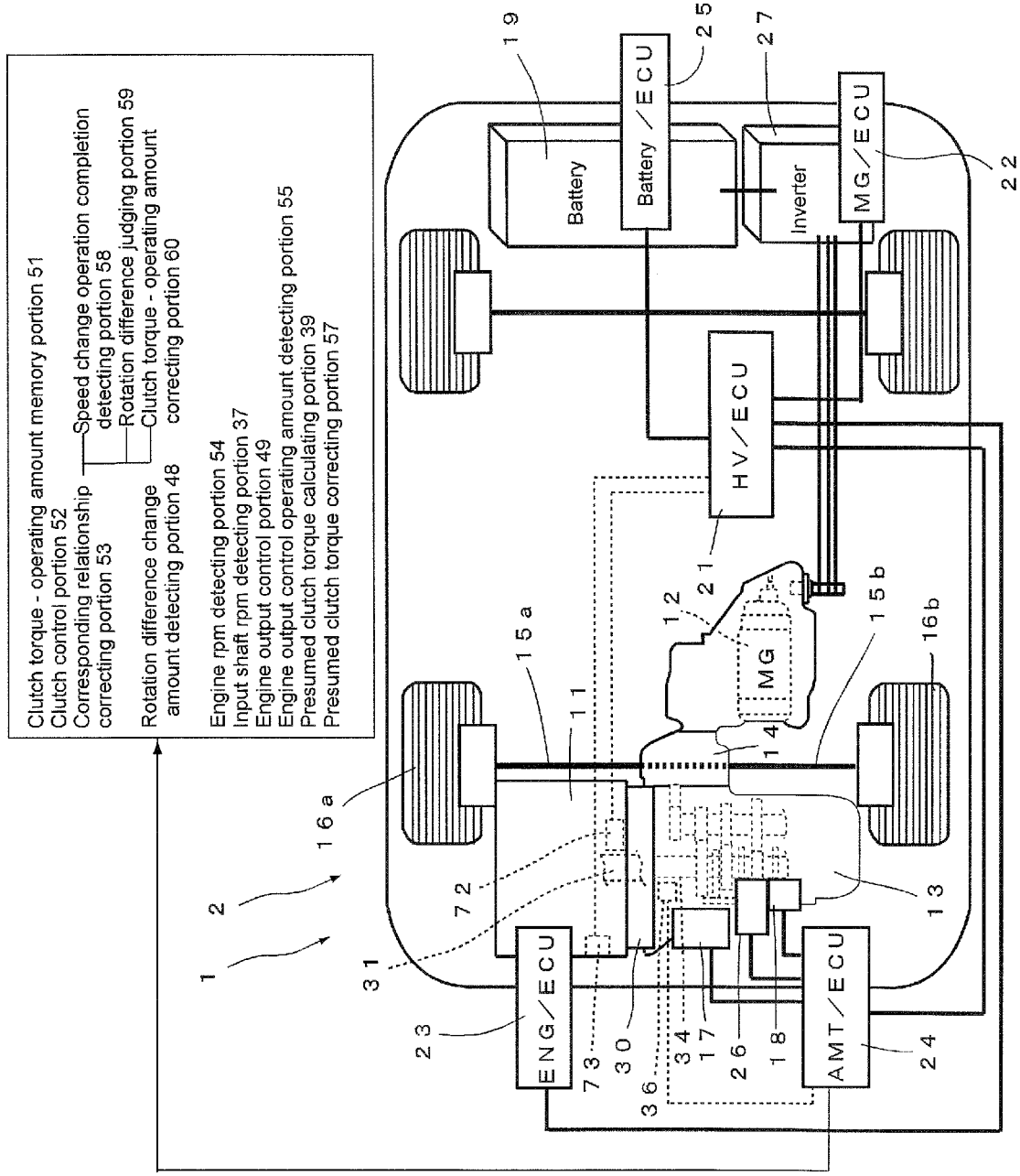
FIG. 1 is a schematic structural view of a hybrid vehicle including a gear shifting control device according to an embodiment of the invention.

The embodiments of the transmission associated with the present invention will be explained with reference to the attached drawings. FIG. 1 is a block diagram showing the structure of the hybrid vehicle applicable to the invention and in FIG. 1, the hybrid vehicle 1 is provided with an engine 11 and a motor/generator 12 (corresponding to motor of the definition of the invention and hereinafter referred to as MG) which is driven by an accumulated electric power in the battery 19.

Figure 2:
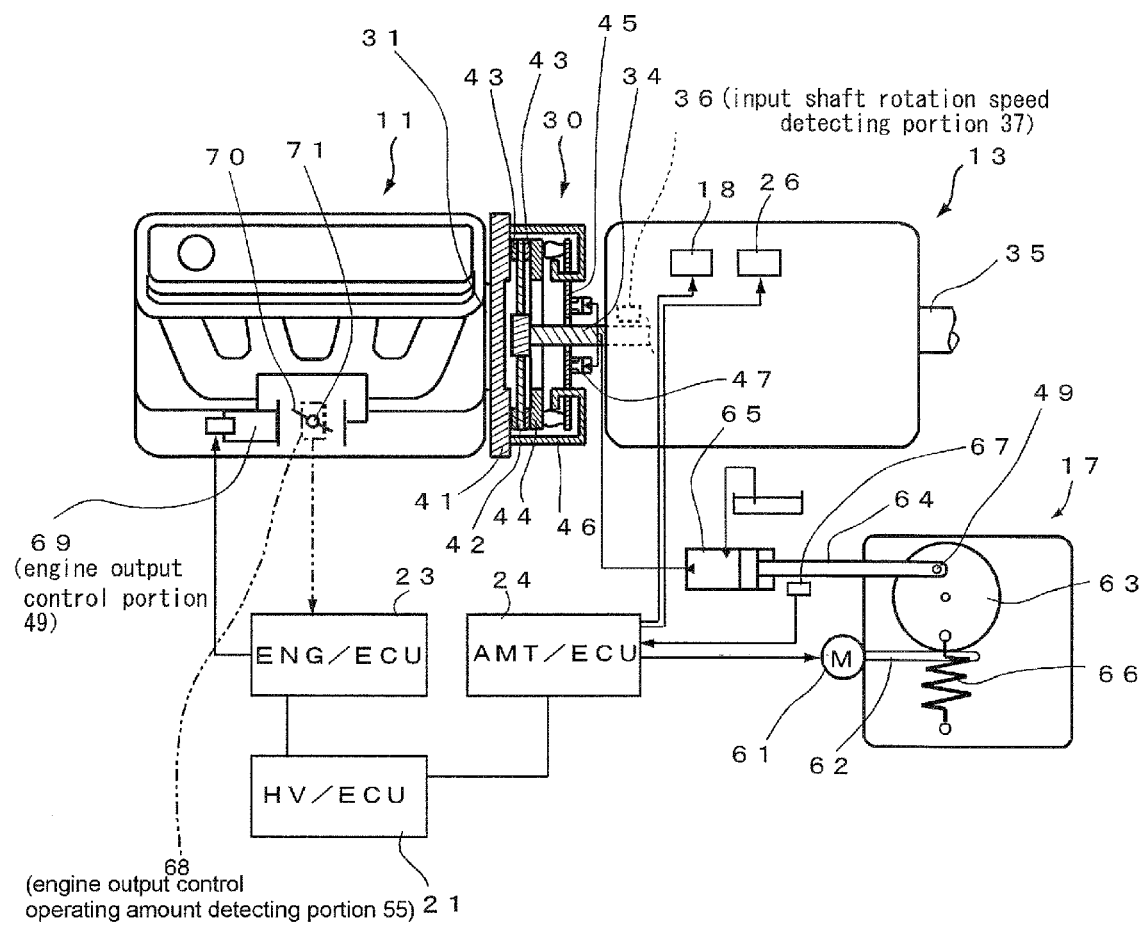
FIG. 2 is a schematically illustrated structure of engine, automated manual transmission and clutch device.

The hybrid vehicle 1 is formed by an automated manual transmission (AMT) 13 (corresponding to the automated manual transmission of the invention) rotatably connected to an output shaft 31 (corresponding to the output shaft of the invention) of the engine 11 as shown in FIGS. 1 and 2 for changing the rotation speed of the output shaft 31 with a plurality of speed change stages with a plurality of speed change ratios, a clutch device 30 (corresponding to the clutch of the invention) for controlling engagement/disengagement operation between the output shaft 31 of the engine 11 and an input shaft 34 of the AMT 13 and controlling the clutch torque transmitted from the output shaft 31 to the input shaft 34 to be a target clutch torque Tr, a differential gear device 14 as shown in FIG. 1, drive shafts 15a and 15b and drive wheels 16a and 16b.

Further, in the hybrid vehicle 1, an HV/ECU (Hybrid Vehicle Electronic Control Unit) 21, an MG/ECU 22 which sends command for driving or regenerating to the MG (motor/generator) 12, an inverter 27 which supplies the MG with electric power, an ENG/ECU 23 which controls the engine 11 to stop or to burn, an AMT/ECU 24 which is connected to a clutch actuator 17, a shift actuator 18 and a select actuator 26 which are assembled into the automated manual transmission 13 for controlling each actuator 17, 18 and 26 to perform an optimal speed change operation and a battery/ECU 25 controlling the charge/discharge state of a battery 19 connected to the inverter 27. These ECUs 22, 23, 24 and 25 are connected to the HV/ECU 21 through a CAN connection and are controlled by the HV/ECU 21.

Each ECU 21, 22, 23, 24 and 25 is provided with a control portion (not shown) which includes a CPU (Central Processing Unit) for calculation, ROM, RAM and an EEPROM (Electrically Erasable Programmable Read-Only Memory) which can maintain the data without back-up electric source (all elements of the control portion are not shown). The control portion executes calculation processing based on the control programs and maps memorized in ROM by CPU. The ROM is a memory portion memorizing various control programs and maps which are referenced upon execution of the programs. The RAM corresponds to a memory which temporarily memorizes the calculation results calculated at the control portion and the data inputted from the exterior devices. The EEPROM keeps the memorized data and is made by a non-volatile material. The components CPU, ROM, RAM and EPPROM of the control portion are connected with one another through a bus line (not shown) and are connected to an input interface and output interface (not shown).

According to the hybrid vehicle 1 of the embodiment of the present invention, the hybrid vehicle 1 starts with only by driving of MG 12 and if the driving force of the MG 12 is not sufficient, the vehicle starts by using the engine additionally by operating an ignition switch 73 provided at the engine 11. Thus, the vehicle can be driven by both driving forces of the MG 12 and the engine 11 or by only the driving force of the engine 11.

The gear shifting control device 2 is formed by the engine 11, automated manual transmission 13, input shaft rotation speed sensor 36 (forming a later explained input shaft rotation speed detecting portion 37) engine rotation speed sensor 72 (forming a later explained engine rotation speed detecting portion 54), clutch device 30, MG 12 (motor/generator), HV/ECU 21, ENG/ECU 23 and AMT/ECU 24.

Further, the gear shifting control device 2 is controlled by the clutch-operating amount memory portion 51, clutch control portion 52, corresponding relationship correcting portion 53, engine rotation speed detecting portion 54, input shaft rotation speed detecting portion 37, engine output control portion 49, engine output control operating amount detecting portion 55, engine torque detecting portion 56, presumed clutch torque calculating portion 39, rotation speed difference change amount detecting portion 48 and presumed clutch torque correcting portion 57 of the AMT/ECU 24.

As shown in FIG. 1 or 2, various sensors are connected to the HV/ECU 21, such as for example, an ignition switch 73, engine rotation speed sensor 72 and acceleration opening degree sensor (not shown). The AMT/ECU 24 is connected to an input shaft rotation speed sensor 36, a stroke sensor 67, the clutch actuator 17, the shift actuator 18 and the select actuator 26. The HV/ECU 21 receives the detected signals from each sensor for detecting a vehicle running state (ON-OFF of the ignition switch 73, engine rotation speed Ne etc.) and AMT/ECU 24 receives signals from the stroke sensor 76 for detecting an actuator operating amount Sa of the clutch actuator 17 and detects the input shaft rotation speed Ni by the signal from the input shaft rotation speed sensor 36. Based on the detected vehicle running state and in response to the intension of the operator of the vehicle, the HV/ECU 21 controls the AMT/ECU 24 and the AMT/ECU 24 drives the clutch actuator 17, shift actuator 18 and the select actuator 26 to perform the speed change or gear shifting operation of the automated manual transmission 13.

First, with reference to the attached drawings, FIGS. 3 and 4, the engine 11, AMT 13, clutch device 30, MG 12, HV/ECU 21, ENG/ECU 23 and the AMT/ECU 24 which form the speed change control device 2 will be explained in detail. It is noted however, that MG 12 is a three-phase electric motor generally used in a hybrid vehicle and therefore detail explanation thereof will be omitted.

As shown in FIG. 2, the clutch device 30 is assembled to the output shaft 31 of the engine 11 and the output shaft 31 and the input shaft 34 of the AMT 13 are connected to with each other through the clutch device 30. The clutch device 30 is formed by a friction clutch of dry-type with a single disc.

The engine 11 is provided with a throttle valve 70 forming an engine output control portion 49 for controlling the engine output by adjusting the intake air amount, a throttle sensor 68 (corresponding to the engine output control operating amount detecting portion 55) for detecting opening degree of the throttle valve 70 (throttle opening) which corresponds to the engine output control operating amount and a throttle actuator 69 (corresponding to the engine output control portion 49) for opening and closing the throttle valve 70. The throttle sensor 68 and the throttle actuator 69 are connected to the ENG/ECU 23 and upon receipt of the command from the HV/ECU 21, the ENG/ECU 23 controls the throttle actuator 69 and a throttle opening degree signal is sent to the ENG/ECU 23 from the throttle sensor 68.

It is noted that in FIG. 2, the throttle actuator 69 does not show that the throttle actuator 69 controls the opening/closing of the throttle valve 70. However, since the drawings are schematically illustrated and in actual use, the throttle actuator 69 is structured to rotate the throttle shaft 71 which is a rotation shaft of the throttle valve 70.

As shown in FIG. 1, in the vicinity of the output shaft 31 of the engine 11, an engine rotation speed sensor 72 of non-contact type is provided for detecting the rotation speed of the output shaft 31. Further, an acceleration opening degree sensor is provided at the acceleration pedal (gas pedal) (not shown) for detecting the depression degree of the pedal. When the operator of the vehicle depresses on or release from the acceleration pedal, an acceleration opening degree signal is sent to the HV/ECU 21 from the acceleration opening degree sensor and the intent of the operator (or request) for acceleration/deceleration or normal running is transmitted thereto. The HV/ECU 21 sends the command value in response to the acceleration opening degree value to the ENG/ECU 23 when the engine 11 is in operative condition. Then the ENG/ECU 23 controls the opening and closing operation of the throttle valve 70 by operating the throttle actuator 69 based on the received command value thereby to control the engine output and the engine rotation speed Ne observing the rotation speed of the output shaft 31 by the engine rotation speed sensor 72.

It is noted that in the embodiment, the engine rotation speed Ne is not controlled only by the depression amount of the acceleration pedal by the operator of the vehicle, but also is controlled upon request from the AMT/ECU 24 through the HV/ECU 21 by operating the throttle actuator 69, regardless of the depression amount of the acceleration pedal.

As shown in FIG. 2, the clutch device 30 (corresponding to the clutch of the invention) is formed by a flywheel 41 fixed to the output shaft 31 of the engine 11, a clutch disc 42 on which a pair of clutch facings is adhered and fixed to both outer peripheral surface sides and rotatably connected to the input shaft 34 of the AMT with a spline connection, a pressure plate 44 which is a clutch assembly fixed to the flywheel 41, a diaphragm spring 45, clutch cover 46 and a hydraulic direct cylinder 47 (concentric slave cylinder).

Further, the clutch device 30 changes the pressurized load applied on the clutch disc 42 relative to the flywheel 41 through the hydraulic direct cylinder 47, diaphragm spring 45 and the pressure plate 44. Thus, the rotation transmitting amount between the flywheel 41 and the clutch disc 42 can be increased or decreased to control the clutch torque Tc to be the target clutch torque Tr.

The clutch actuator 17 is formed by a DC electric motor 61, gear reduction mechanism 62, an output wheel 63, an output rod 64, a master cylinder 65 and an assisting spring 66 as shown in FIG. 2.

The gear reduction mechanism 62 is formed by a worm gear formed on an output shaft of the DC electric motor 61 the output wheel 63 is rotated by the driving force of the DC electric motor 61 through the gear reduction mechanism 62. Further, by the rotation of the output wheel 63, the output rod 64 connected to the output wheel 63 by the pivot pin 49 is moved (advance or retreat) forward (left side as viewed in FIG. 2) or rearward (right side as viewed in FIG. 2) to operate the master cylinder 65. By the operation of the master cylinder 65 the hydraulic pressure is generated and is applied to the hydraulic direct cylinder 47 which form the clutch device 30. The assisting spring 66 is connected to the output wheel 63 and generates an assisting force in a direction of clutch being disengaged (counterclockwise direction as viewed in FIG. 2) to rotate the output wheel 63 with a force smaller than the output torque from the DC electric motor 61.

For example, when the clutch actuator 17 in FIG. 2 is in an initial stage that the actuator 17 is not controlled, a pressurized load is generated at the pressure plate 44 through the output rod 64, the hydraulic direct cylinder 47 and the diaphragm spring 45 which generates a spring reaction force (biasing force biasing the pressure plate 44 towards the fly wheel 41 direction) of the clutch device 30. Thus the clutch disc 42 receives the pressurized load in the flywheel 41 direction and fully engaged with the flywheel 41 to be able to fully transmit the rotation from the engine 11 side.

On the other hand, when the clutch actuator 17 is controlled and the hydraulic direct cylinder 47 is operated by the leftward movement of the output rod 64 in FIG. 2, the inner diameter portion of the diaphragm spring 45 is depressed and deformed and the force at the outer diameter portion of the diaphragm spring 45 pressing on the pressure plate 44 becomes weak and accordingly, the pressurized load on the clutch disc 42 relative to the fly wheel 41 is decreased. A sliding operation is generated between the fly wheel 41 and the clutch disc 42 in response to the degree of the clutch actuator operating amount Sa of the output rod 64 to be in a half-clutch operation state. The engine torque Te is transmitted to the input shaft 34 of the AMT 13 in response to the engagement state.

Figure 3:
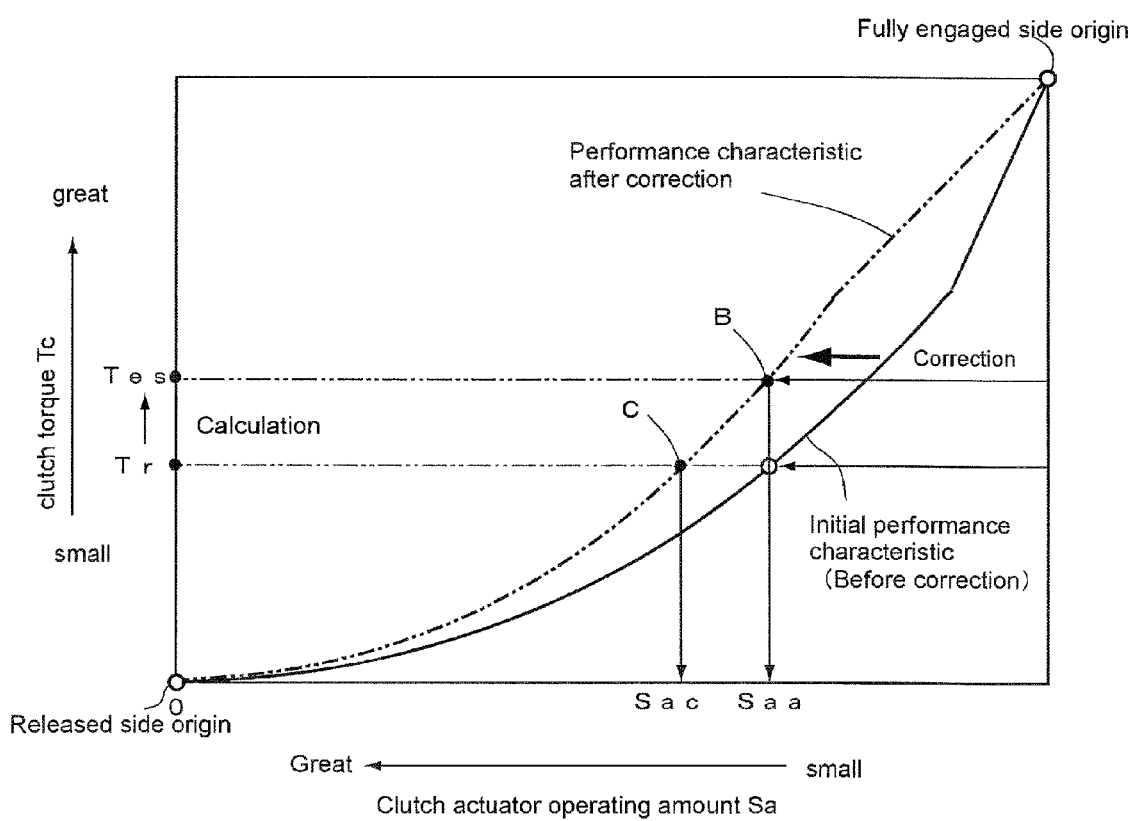
FIG. 3 is a map of clutch torque which shows the relationship between the clutch torque and the clutch actuator operating amount.
Figure 4:
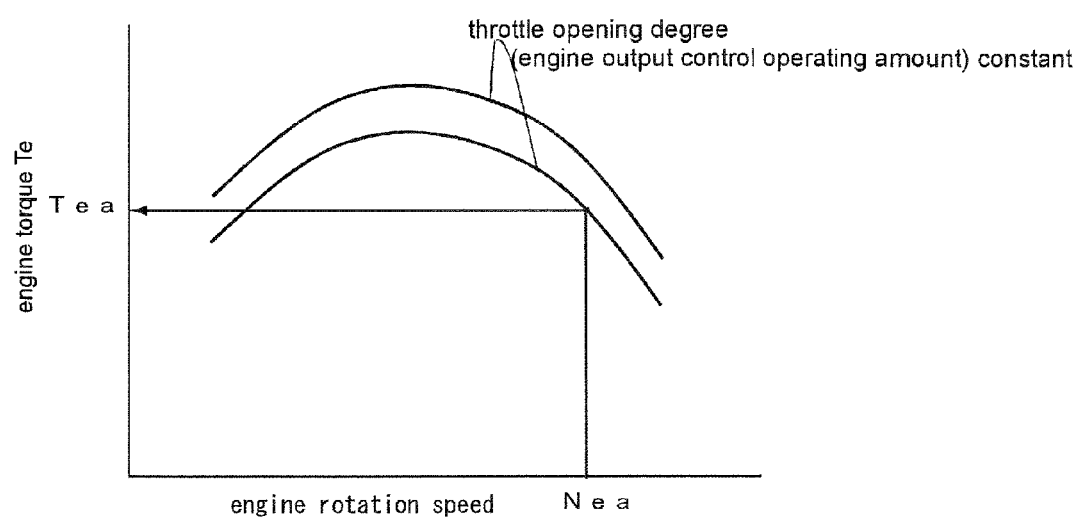
FIG. 4 is a graph showing the engine control operating amount, the engine torque under constant operational state and engine rotation speed.

In FIG. 3, the clutch torque map is shown which explains the corresponding relationship between the clutch actuator operating amount Sa under an initial state (vehicle under the shipping state) and an engine torque (=clutch torque Tc) transmitted to the input shaft 34 of the AMT 13 at the time that the clutch actuator is operated by the operating amount Sa indicated with a solid line in the graph. This performance characteristic is memorized in the ROM of the AMT/ECU 24 (corresponding to the clutch torque-operating amount memory portion 51). In FIG. 3, the complete engagement state between the fly wheel 41 and the clutch disc 42 is shown at the right side as viewed in FIG. 3 and the disengagement state (clutch released state) therebetween is shown at the left side. The zero point (origin point of the graph) indicates either the complete engagement state or the disengaged (released) state.

In order to obtain the target clutch torque Tr, the operating amount in an axial direction of the output rod 64 of the clutch actuator 17 is operated by the clutch actuator operating amount Saa which corresponds to the target clutch torque Tr based on the clutch torque Tc—clutch actuator operating amount Sa map (solid line graph) indicated in FIG. 3 by the AMT/ECU 24.

The operating amount of the output rod 64 is detected by the stroke sensor 67 which is of non-contact type and is provided in the vicinity of the output rod 64. The stroke sensor 67 is a rotation angle sensor formed by Hall IC and is connected to the AMT/ECU 24 and the data of the clutch actuator operating amount Saa detected by the stroke sensor 67 is sent to the AMT/ECU 24.

The actual value of the clutch torque Tc when the output rod 64 is operated by the clutch actuator operating amount Saa to be controlled to obtain the target clutch torque Tr may be deviated from the target clutch torque Tr. This is because the clutch torque Tc—clutch actuator operating amount Sa map indicated in FIG. 3 is statically obtained based on the cushioning performance characteristic of the clutch disc under the vehicle shipping state. In other words, the performance characteristics of clutch torque Tc—clutch actuator operating amount Sa may be changed from the original state due to the friction abrasion of the clutch facing 43 with the secular change, varied state of the friction surface coefficient of friction μ due to the heat generated at the pressure plate 44 and of the deterioration with age, etc. Therefore, according to the invention, when the absolute value |Ne−Ni| of the difference between the engine rotation speed Ne and the input shaft rotation speed Ni exceeds a predetermined value, the learning of the clutch torque Tc—clutch actuator operating amount map Sa is performed.

In more detail, the learning is performed when the difference |Ne−Ni| becomes equal to or more than the predetermined value under the condition that under a speed change (gear shifting) operation, the speed change is completed from one speed stage (a speed change ratio) to another speed stage (another speed change ratio) and the clutch device 30 being in engagement. Further, when the clutch device 30 is controlled so that the clutch torque Tc becomes the target clutch torque Tr based on the map in FIG. 3, the engine torque detecting portion 56 obtains the engine torque "Tea" (See FIG. 4) based on the engine rotation speed Nea at the time of a predetermined throttle opening degree (engine output control operating amount) by which the engine 11 is controlled. The presumed clutch torque Tes is calculated by the presumed clutch torque calculating portion 39 based on thus obtained engine torque "Tea". Then the learning is performed by matching the calculated presumed clutch torque Tes with the clutch actuator operating amount Saa of the output rod 64 operated for obtaining the target clutch torque Tr (point B in FIG. 3). The presumed clutch torque Tes is replaced with the clutch torque Tc corresponding to the clutch actuator operating amount Saa. Then, the solid line graph in FIG. 3 is corrected to be the two-dotted line graph which passes the point B. The two-dotted line graph is prepared and introduced in advance by an experiment. Thus, if the clutch torque Tc is controlled to the next target clutch torque Tr, the corrected two-dotted line graph is used. By operating the output rod 64 by the clutch actuator operating amount Sac which corresponds to the point C (target clutch torque Tr) on the two-dotted line, further accurate target clutch torque Tr can be obtained.

It is noted that as a learning condition, the absolute value |Ne−Ni| of difference is equal to or more than a predetermined value. It is necessary for the gear shifting control device 2 to set a predetermined continuing time period for learning and the judgment whether or not such continuing time period can be assured is replaced with the judgment by the absolute value of rotation speed difference between the engine rotation speed Ne and the input shaft rotation speed Ni of the AMT 13.

In other words, when the rotation speed difference between the engine rotation speed Ne and the input shaft rotation speed Ni of the AMT is equal to or more than the predetermined value, the engine torque Te is applied to the clutch device 30 under a half clutch state (engagement state). Under the half clutch state (engagement state), the presumed clutch torque Tes at that time can be learned as the clutch torque after correction. If the engine torque is equal to or more than a predetermined value and in order to secure the continuing time period for the half clutch state (engagement state) necessary for learning, the judgment whether or not such continuing time period can be assured is replaced with the judgment by the absolute value of rotation speed difference between the engine rotation speed Ne and the input shaft rotation speed Ni of the AMT 13. The predetermined value |Ne−Ni| can be set to a value which can sufficiently secure the time necessary for learning and appropriately set by an experiment or the like.

Next, the AMT 13 will be explained in detail. The AMT (automated manual transmission) 13 includes an existing gear shifting manual transmission and the clutch device 30 which is controlled by the clutch actuator 17 to perform an automatic transmission operation. This is a so-called AMT. The AMT 13 includes the input shaft 34 and the output shaft 35 and includes a speed change gear train to perform a plurality of speed change operations. According to the embodiment, the gear train is a parallel shaft gear wheel type gear shifting transmission which performs five advance speed stages and one reverse speed stage. The gear ratio is gradually decreased in order from the first speed stage towards fifth speed stage. The gear ratios of the first to third exceeds 1:1 (one) and the gear ratio at the fourth speed stage is equal to 1:1 (one) and at the fifth speed stage the gear ratio is smaller than 1:1 (one).

The input shaft 34 of the AMT 13 is connected so that the power (clutch torque Tc) from the clutch device 30 side can be transmitted and the output shaft 35 is connected to the drive shafts 15*a* and 15*b* through differential gear device 14. The clutch torque Tc transmitted from the engine 11 is decreased or increased by the speed change gear train and transmitted via the differential gear device 14 to the drive shafts 15*a* and 15*b* and the drive wheels 16*a* and 16*b* to drive the vehicle. Similarly, the torque from the MG 12 is transmitted to the drive wheels via the differential gear device 14 by alone or together with the engine 11 output.

The AMT 13 includes a group of speed change actuators (the clutch actuator 17, shift actuator 18 and the select actuator 26) connected to the AMT/ECU 24 for changing operation of the speed change controlled by the AMT/ECU 24.

Figure 5:
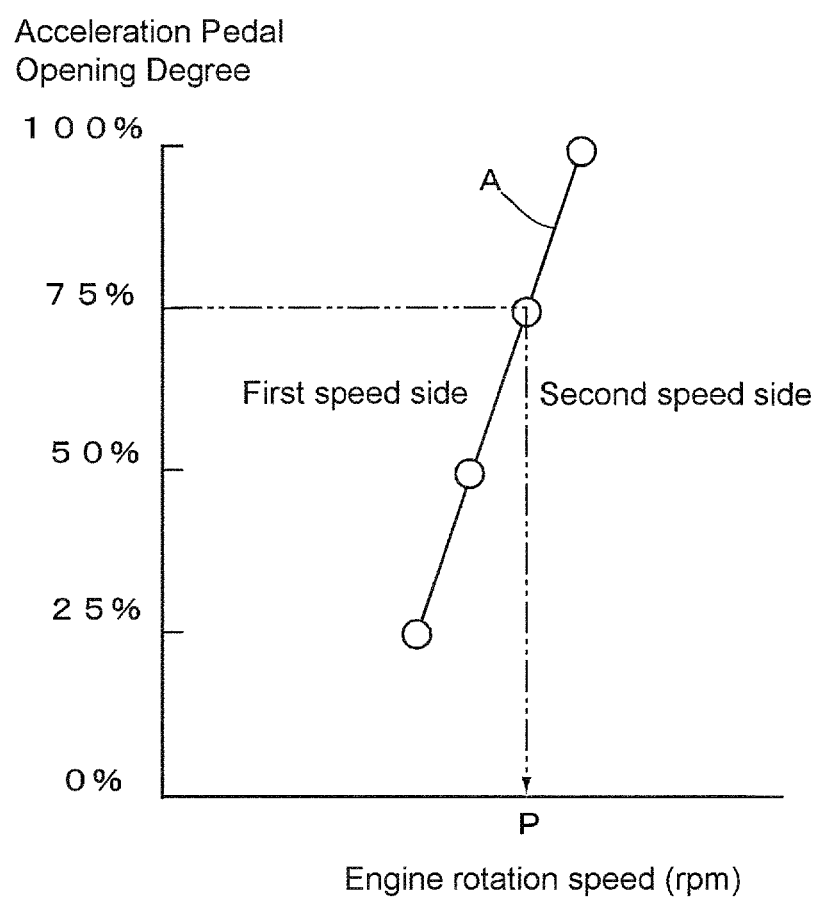
FIG. 5 is an example of speed change performance line.

The AMT/ECU 24 memorizes in the ROM the speed change performance lines (See FIG. 5) which are set per every speed change stage (speed change ratio). The speed change performance line A in FIG. 5 representatively indicates the first speed stage speed change performance line at the speed increase side from a first speed stage (one speed change ratio) to a second speed stage (another speed change ratio). These speed change performance lines are included in the map data which is used upon speed change operation of the vehicle. The preselected speed stage selection parameters (in this embodiment, engine rotation speed and the acceleration pedal opening degree) are set at each axis. The performance lines are the reference lines which judge whether a speed stage is required to be changed from one speed change ratio to another speed change ratio.

Figure 6:
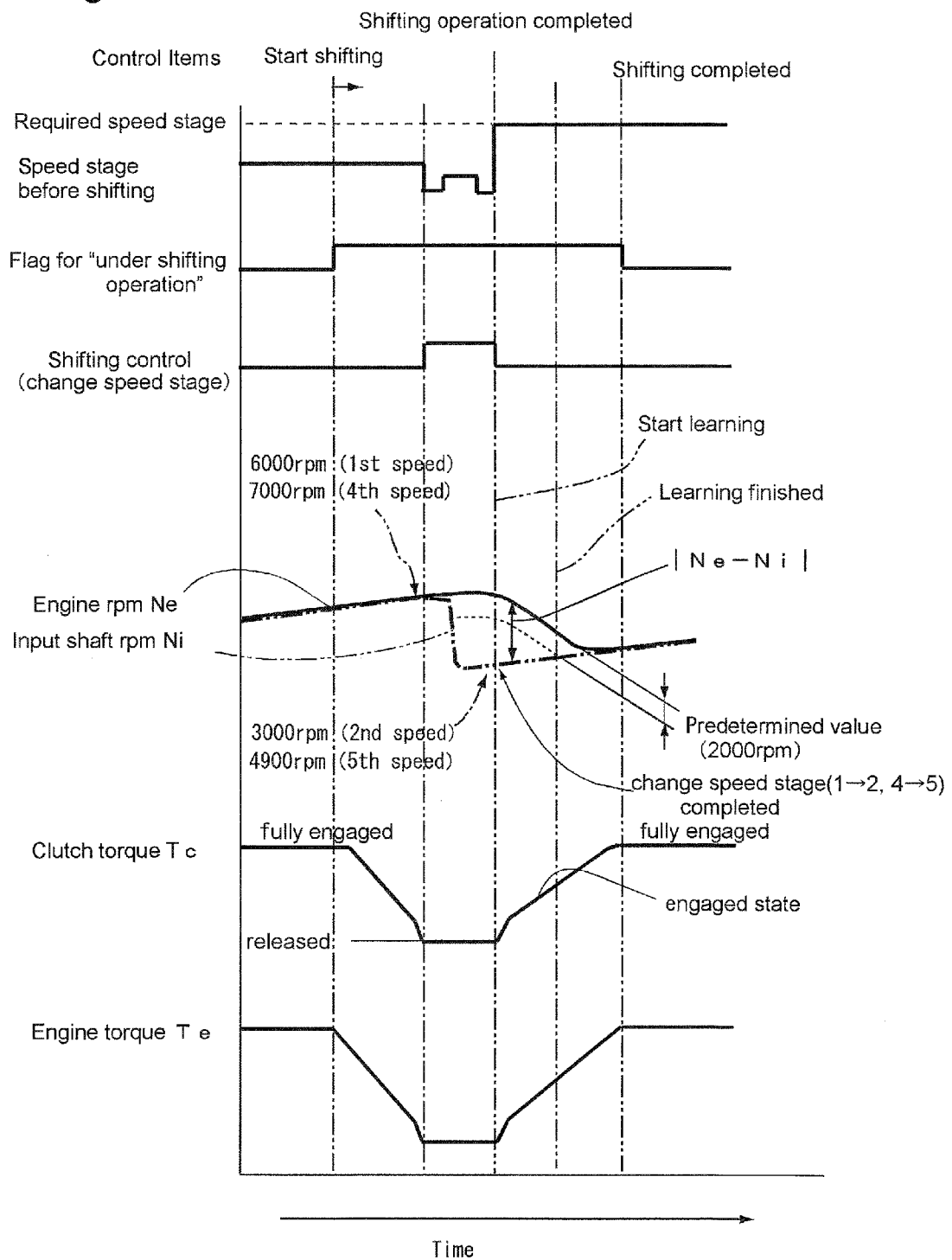
FIG. 6 is a time chart showing control state of engine rotation speed Ne and input shaft rotation speed Ni upon presumed torque learning associated with the embodiment of the invention.

The speed change points (not shown) exist on the speed change performance line A for every acceleration pedal opening degree. If under the first speed stage, the operator of the vehicle depresses the acceleration pedal by seventy-five (75) % of the total depression amount, the engine rotation speed increases to the rotation speed of P rpm at the intersection on the line A, the AMT/ECU 24 starts to initiate the speed change operation. As shown in FIG. 6, when the speed change operation begins, the ENG/ECU 23 drives the throttle actuator 69 to operate the throttle valve 70 in a closing direction and based on the command value of the HV/ECU 21, engine torque Te is decreased (See engine torque Te of the control item in FIG. 6). Approximately the same time, the AMT/ECU 24 starts operation of the clutch actuator 17 to move the output rod 64 of the clutch actuator 17 to the left as viewed in FIG. 2. Then the engagement between the fly wheel 41 and the clutch disc 42 of the clutch device 30 is released and is eventually disengaged (See clutch torque Tc of the control item in FIG. 6). Under this state, the throttle valve 70 is fully closed and the engine torque Te becomes the smallest.

The AMT/ECU 24 changes the gear train (speed stage) of the AMT 13 from the first speed stage to the second speed stage by suitably driving the shift actuator 18 and select actuator 26 under the throttle valve 70 being fully closed and the clutch device 30 being in disengaged state. After the speed change of the gear train is completed, the ENG/ECU 23 drives the throttle actuator 69 to open the throttle valve 70 in response to the command value of the AMT/ECU 24 via the HV/ECU 21 to increase the engine torque Tc.

Approximately at the same time, the AMT/ECU 24 drives the clutch actuator 17 to change the operating amount Sa thereof in the engagement direction of the clutch device 30 so that the clutch device 30 becomes again in the engagement state. Then the AMT/ECU 24 controls the clutch actuator 17 so that the clutch actuator operating amount Sa becomes the operating amount Saa which corresponds to the target clutch torque Tr based on the solid line graph in the map in FIG. 3 in order to match the clutch torque Tc with the target clutch torque Tr which is the value based on the command from the AMT/ECU 24. Thus, the engine torque Te is applied to the clutch device 30 to make the clutch device to be in half clutch state(clutch engagement state) so that the engine rotation speed Ne and the input shaft rotation speed Ni of the AMT 13 after the speed change (gear shifting) operation can be suitably adapted and finally the fly wheel 41 and the clutch disc 42 are fully engaged to complete the speed change to the second speed stage. It is noted here that the operation and the driving method of the shift actuator 18 and the select actuator 26 are well known, for example, disclosed in a Japanese patent publication (JP2004-176894A) and the explanation thereof will be omitted.

It is noted that in order to supplement the insufficient driving force during the engine torque Te being in decrease after initiation of the gear shifting control and under the clutch device 30 being disengaged state, the MG 12 may be driven to apply the driving torque therefrom to the drive shafts 15*a* and 15*b* and the drive wheels 16*a* and 16*b* via the differential gear device 14. This can avoid any speed loosing or stalling feeling which the operator of the vehicle feels.

As explained, the HV/ECU 21 manages the integrated control of the hybrid vehicle 1 as a whole and the AMT/ECU 24 is formed by the clutch torque—operating amount memory portion 51 forming the gear shifting control device 2, the clutch control portion 52, the corresponding relationship correcting portion 53, engine rotation speed detecting portion 54, input shaft rotation speed detecting portion 3 the rotation difference change amount detecting portion 48, the engine output control portion 49, engine output control operating amount detecting portion 55, the engine torque detecting portion 56, the presumed clutch torque calculating portion 39 and the presumed clutch torque correcting portion 57 (See FIG. 1). Further, the corresponding relationship correcting portion 53 includes speed change operation completion detecting portion 58, rotation difference judging portion 59 and the clutch torque—operating amount correcting portion 60. The AMT/ECU 24 learns and corrects the corresponding relationship between the clutch actuator operating amount Sa of the clutch device 30 and the clutch torque Tc under the speed change operation by the respective portions.

The clutch torque—operating amount memory portion 51 memorizes in the ROM the clutch torque Tc—clutch actuator operating amount Sa map (solid line map) which indicates the corresponding relationship between the clutch actuator operating amount Sa and the clutch torque Tc as indicated in FIG. 3 and at the same time the clutch torque—operating amount memory portion 51 memorizes the corrected corresponding relationship between the clutch actuator operating amount Sa and the clutch torque Tc.

The clutch control portion 52 obtains the clutch actuator operating amount Saa which is controlled by clutch actuator 17 to obtain the desired target clutch torque Tr from the clutch torque—operating amount memory portion 51. The obtained clutch actuator operating amount Saa data is sent to the AMT/ECU 24 to drive the clutch actuator 17 by the AMT/ECU 24 to operate the output rod 64 by the clutch operating amount Saa so that the clutch torque Tc becomes the target clutch torque Tr. The engine rotation speed detecting portion 54 detects the engine rotation speed Ne by the engine rotation speed sensor 72 provided on the output shaft 31 of the engine 11. The engine output control operating amount detecting portion 55 is provided with the throttle sensor 68 and detects the throttle opening degree (engine output control operating amount) of the throttle valve 70 (engine output control portion) which controls the engine torque Te by the throttle sensor 68.

The engine torque detecting portion 56 detects the engine torque Te by the throttle opening degree detected by the engine output control operating amount detecting portion 55 and the engine rotation speed Ne detected by the engine rotation speed detecting portion 54 based on the relationship (See FIG. 4) between each throttle opening degree which corresponds to each operating amount of the engine output control operating amount prepared in advance and memorized in the ROM of the AMT/ECU 24.

The input shaft rotation speed detecting portion 37 detects the input shaft rotation speed Ni of the input shaft 34 by the input shaft rotation speed sensor 36 provided in the vicinity of the input shaft 34 of the AMT 13. The input shaft rotation speed sensor 36 is a non-contact type sensor and is connected to the AMT/ECU 24 and the detected rotation speed signal is sent to the AMT/ECU 24.

The rotation difference change amount detecting portion 48 judges whether a change amount (differential value) of the absolute value |Ne−Ni| which is the difference value between the engine rotation speed Ne and the input shaft rotation speed Ni, detected by a later explained rotation difference judging portion 59 and the detected value of which is equal to or more than a predetermined value, is equal to or less than a predetermined value. If the change amount (differential value) is judged to be equal to or less than the predetermined value, the difference in absolute value |Ne−Ni| is decreasing under the clutch engagement state where the engine torque is applied. As explained if the change amount is equal to or less than the predetermined value, or in other words, if the detected difference is gradually decreasing, such timing is suitable for learning to secure the continuing time period for clutch engagement state and similar to the learning at the vehicle starting, a stable and accurate data can be obtained by this learning. The predetermined value can be appropriately set in random.

The presumed clutch torque calculating portion 39 calculates the presumed clutch torque Tes by subtracting the inertia torque obtained by multiplying the acceleration speed of the engine rotation speed Nea by the rotation inertia moment of the engine from the engine torque Tea (See FIG. 4) which is calculated by the throttle opening degree (engine output control operating amount) and the engine rotation speed Nea at the throttle opening degree of that time, when the clutch control portion 52 operates the clutch actuator 17 by the clutch actuator operating amount Saa corresponding to the target clutch torque Tr.

The presumed clutch torque Tes can be obtained by a method disclosed in the Japanese patent publication (JP2005-214331). The method is shown by the following formula M1 (1). In the formula (1), the actually outputted clutch torque Tc as the presumed clutch torque Tes is obtained when the clutch actuator operating amount Sa of the clutch device 30 is changed from the released side original point as indicated in FIG. 3 towards the complete engagement operation until the amount becomes the operating amount Saa to obtain the desired target clutch torque Tr.

(M 1)

$$Tes = Te - J \cdot (dNe/dt) \quad (1)$$

Wherein, in the formula (1), Tes represents the presumed clutch torque, Te represents the engine torque, J represents engine inertia (rotation inertia moment) which is a design value specific to the engine, Ne represents the engine rotation speed and dNe/dt represents the engine rotation speed acceleration speed.

As a condition of learning, when the engine rotation speed becomes a stable condition the above calculation indicated by the formula (1) is carried out to set the presumed clutch torque Tes. For example, the presumed clutch torque calculating portion 39 watches the engine rotation speed acceleration speed dNe/dt indicated at the second term at right-hand side of the formula (1) and when the value dNe/dt falls within the predetermined range the condition for learning is judged to be established and the calculation for the presumed clutch torque value Tes can be carried out. Thus, the calculation result is stable and at the same time accurate. The range for the learning condition can be set in random.

The presumed clutch torque correcting portion 57 corrects the presumed clutch torque Tes calculated by the presumed clutch torque calculating portion 39 in response to at least one of the engine rotation speed Ne and the input shaft rotation speed Ni. It is noted that here ion this embodiment, both values Ne and Ni are used for correcting the presumed clutch torque Tes.

First, the correction of the presumed clutch torque with respect to the engine rotation speed Ne will be explained hereinafter. As explained, according to the embodiment of the invention, under the clutch device 30 being in engagement state, the diaphragm spring which generates a spring reaction force pushes the pressure plate 44 at the outer peripheral surface thereof at the point of action of the leverage so that a pressurized load is applied on the pressure plate 44. Then the pressure plate 44 is operated as if a weight is applied thereto to increase the centrifugal force of the weight in proportion to the engine rotation speed. The inventors of this invention confirmed that this operation changes the transmitted torque from the engine 11. By this reason, the correction is made to the presumed clutch torque Tes calculated according to the formula (1) by the generated centrifugal force. As explained, the presumed clutch torque after correction "Teseng" is calculated to correct the presumed clutch torque to be a more accurate value than the value Tes. The correction value varies depending on the performance characteristics or the structure of the clutch device 30 and accordingly the value obtained by the experiment is applied.

Next, the correction of the presumed clutch torque with respect to the input shaft rotation speed Ni of the input shaft 34 of the AMT 13 will be explained hereinafter. The inventors confirmed that the presumed clutch torque Tes varies in proportion to the input shaft rotation speed Ni by the experimental work. Therefore, the variation amount which varies the value of the clutch torque Tc in response to the input shaft rotation speed Ni was first obtained by the experimental work and then the correction was made to the presumed clutch torque after correction Teseng which had been corrected in response to the engine rotation speed Ne by considering the variation amount obtained here. Thus, the presumed clutch torque after correction Tesns was calculated. It is noted that the correction based on the engine rotation speed was first introduced in this embodiment, but the correction based on the input shaft rotation speed may be made first prior to the correction based on the engine rotation speed.

The corresponding relationship correcting portion 53 learns the relationship between the clutch torque Tc transmitted by the clutch device 30 and the clutch actuator operating amount Sa when the clutch device 30 is operated and corrects the relationship between the clutch actuator operating amount Sa and the clutch torque Tc which is memorized in the clutch torque—operating amount memory portion 51 based on the learning.

The corresponding relationship correcting portion 53 includes the speed change operation completion detecting portion 58, the rotation difference judging portion 59 and the clutch torque—operating amount correcting portion 60. The speed change operation completion detecting portion 58 detects the completion of the speed change operation, i.e., changing of the speed stage upon the speed change operation of the AMT 13 by receiving the signal from the AMT/ECU 24.

The rotation difference judging portion 59 judges that the difference in the absolute value |Ne−Ni| between the engine rotation speed Ne and the input shaft rotation speed Ni of the AMT 13 during the clutch device 30 in engagement state upon the speed change operation of the AMT 13 is equal to or more than the predetermined value. It is noted that in the embodiment of the invention, the phrase "upon speed change operation of the AMT 13" means that the time from the start of speed change operation (gear shifting operation) when the engine rotation speed Ne at a predetermined acceleration pedal opening degree exceeds one of the plurality of speed change performance lines prepared per each speed change ratio of a plurality of speed stages to the time when the speed stage change (gear shifting operation) of the ATM 13 is completed and the clutch device 30 becomes in complete engagement state over through the engagement state (In FIG. 6 see items of flag for "under speed change operation").

The clutch torque—operating amount correcting portion 60 judges whether the presumed clutch torque after correction Tesns calculated by the presumed clutch torque correcting portion 57 is equal to or more than the predetermined value, when the sped change operation has been completed and the difference in absolute value |Ne−Ni| between the engine rotation speed Ne and the input shaft rotation speed Ni of the AMT 13 is equal to or more than a predetermined value. If the presumed clutch torque after correction Tesns is more than the predetermined value, the value Tc of the clutch torque corresponding to the clutch actuator operating amount Saa which has been controlled to be the target clutch torque Tr in the corresponding relationship between the clutch actuator operating amount Sa and the clutch torque Tc shown in FIG. 3 is replaced with the presumed clutch torque after correction Tesns and the value is memorized in the RAM to correct the map shown in FIG. 3.

It is noted that the predetermined value for judging the magnitude of the presumed clutch torque after correction Tesns is used for suppressing the deviation of the clutch actuator operating amount Sac obtained corresponding to the presumed clutch torque after correction Tesns. In other words, when the value of the presumed clutch torque after correction Tesns is too small, a small inclination area in the clutch torque Tc—clutch actuator operating amount Sa map is used (left side in FIG. 3). This may increase the deviation of the clutch actuator operating amount Sac relative to the presumed clutch torque after correction Tesns due to the deviation of the presumed clutch torque after correction Tesns. Therefore, the learning of the clutch actuator operating amount Sac relative to the presumed clutch torque after correction Tesns is carried out at the area where the inclination in the map is great so that the deviation of the clutch actuator operating amount Sac corresponding to the deviation of the presumed clutch torque after correction Tesns. The predetermined value may be randomly set by a person in charge.

Next, the control for the gear shifting control device 2 associated with the invention will be explained with reference to the attached drawings, particularly the flowchart in FIG. 7 and the control state view in FIG. 6. In this embodiment, the explanation will be made regarding to the gear shifting of an up-shift from a low speed stage (first speed to second speed) in which the speed change ratio is relatively large and the large difference in the absolute value |Ne−Ni| can be obtainable. The predetermined value for the difference in the absolute value |Ne−Ni| in this case is set to be for example, 2000 rpm (revolution per minute).

When the hybrid vehicle 1 is activated, the flowchart starts (at step S10). As explained the hybrid vehicle 1 starts only by the MG 12 and accordingly, the engine 11 is not operated and the clutch device 30 is in disengaged state. However, thereafter, if the charged battery which drives the MG 12 is found to be not sufficient, or the operator of the vehicle requests acceleration of the vehicle by depressing the acceleration pedal, the HV/ECU 21 sends the command signal to the ENG/ECU 24 to activate the ignition switch 73 to be ON. Then the engine 11 is also started.

At the step S11, the counter (count) and the data number (i) of the presumed clutch torque after correction Tesns are initiated. At the step S12, whether or not the engine rotation speed Ne exceeds any one (in this embodiment, the first speed stage at speed increasing side performance line) of the plurality of speed change performance lines and the AMT 13 becomes "under the speed change operation" (in the middle of speed change operation). If the speed change is confirmed to be "under the speed change operation", the program goes to the step S13 and the learning cannot be carried out since the speed change is not under operation, then the program goes to the step S25 to end the program and returns to the step S10.

At the step S13 (corresponding to the corresponding relationship correcting portion 53 and the speed change operation completion detecting portion 58 of the invention) whether or not the speed change operation is completed which corresponds to the operation of a speed change from one speed change ratio to another speed change ratio, is confirmed based on the signal from the AMT/ECU 24. If the completion is confirmed then the program goes to the step S14 and if the completion is not confirmed, then the program goes to the step S25 to end the program and returns to the step S10.

At the step S14 (corresponding to the corresponding relationship correcting portion 53 and the rotation difference judging portion 59 of the invention), the difference in the absolute value |Ne−Ni| between the engine rotation speed Ne detected by the engine rotation speed detecting portion 54 and the input shaft rotation speed Ni of the AMT 13 detected by the input shaft rotation speed detecting portion 37 under the clutch device 30 being in engagement state is calculated.

Under this situation, if the operator of the vehicle desires an acceleration of the vehicle and depresses on the acceleration pedal to up-shift the AMT 13 from the first (one speed change ratio) to the second speed stage (another speed change ratio), the value of the input shaft rotation speed Ni2 becomes half of the input shaft rotation speed Ni1 at the second speed stage. In more detail, for example, when the hybrid vehicle 1 is running under the first speed stage with the input shaft rotation speed Ni1 being 6000 rpm (vehicle speed of 45 km/h), if the AMT 13 is up-shifted to the second speed stage, the input shaft rotation sped Ni2 becomes about 3000 rpm (vehicle speed of approximately 45 km/h), half of the rpm at the first speed stage. The difference in absolute value |Ne−Ni| of the rotation speed between the input shaft rotation speed Ni2 and the engine rotation speed Ne after the speed change operation has been completed and the clutch device 30 is initiating the clutch engagement operation becomes approximately 3000 rpm. Then whether or not the absolute value |Ne−Ni| is equal to or more than the predetermined value (according to the embodiment, for example, 2000 rpm) is judged. If the difference in the absolute value |Ne−Ni| is 3000 rpm according to the example raised above, the value is over the predetermined value of 2000 rpm and accordingly, the program goes to the step S15. However, if the absolute value |Ne−Ni| is below the predetermined value of 2000 rpm, then the program goes to the step S25 to end the program and returns to the step S10.

At the step S15 (corresponding to the rotation difference change amount detecting portion 48), the change amount (differential value) of the difference between the engine rotation speed Ne and the input shaft rotation speed Ni of the AMT 13 in the absolute value |Ne−Ni| is calculated and whether or not such calculated value is equal to or less than a predetermined value is judged. If the differential value is below the predetermined value, the program goes to the step S16 for continuing the control and at the step S16 the presumed clutch torque Tes is calculated. If the differential value is over the predetermined value, since the learning cannot be performed, the program goes to the step S25 to end the program and returns to the step S10.

At the step S16 (corresponding to the presumed clutch torque calculating portion 39), based on the formula (1), the presumed clutch torque Tes is calculated from the actual engine torque Tea obtained based on the actual engine rotation speed Nea and the throttle opening degree at that time.

At the step S17 (corresponding to the presumed clutch torque correcting portion 57), the presumed clutch torque after correction Teseng is calculated by correcting the presumed clutch torque Tes calculated at the step S16 based on the experimental value corresponding to the magnitude of the engine rotation speed Nea.

At the step S18 (corresponding to the presumed clutch torque correcting portion 57), the presumed clutch torque after correction Tesns (di) is calculated by correcting the presumed clutch torque after correction Teseng calculated at the step S17 based on the experimental value corresponding to the magnitude of the input shaft rotation speed Nia. It is noted that the reference "(di)" indicates the data number.

At the step S19 (corresponding to the corresponding relationship correcting portion 53), whether or not the corrected presumed clutch torque after correction Tesns(di) corrected at the step S18 is equal to or more than the predetermined value is judged. If the value exceeds the predetermined value, then the program goes to the step S20 and if the value is less than the predetermined value, then the program goes to the step S25 to end the program and returns to the step S10.

At the step S20, numeral 1 is added to the counter "count" and the suffix "i" indicating the data number for the presumed clutch torque after correction Tesns (di).

At the step S21, the value of the presumed clutch torque after correction Tesns (di) is memorized in the ROM.

At the step S22, it is confirmed that the data obtaining number for the presumed clutch torque after correction Tesns (di) corresponds to the counter number "3" and if the number corresponds, the program goes to the step S23 and if the number does not correspond to "3", the program goes to the step S12 and from the step S12, the execution of the steps S12 through S21 is repeated. It is noted that the counter number is set "3" in this embodiment, other numbers such as "2" may be used or the number more than 3 will be accepted.

At the step S23, it is confirmed that the difference (range in difference) of the values of (d1) through (d3) is equal to or less than a predetermined value. If the difference is equal to or less than the predetermined value, it can be said that a stable data under the absolute value |Ne−Ni| being gradually decreasing during the clutch engagement operation in which the engine torque Te is applied to the clutch device 30 is obtained. Thus, the reliability of the data for the presumed clutch torque after correction Tesns can be confirmed. Then the program goes to the step S24 for further correction. If the difference exceeds the predetermined value, the program goes to the step S25 to end the prosecution of the program and returns to the step S10. In this case it may be possible that the absolute value |Ne−Ni| changed largely due to some reason. The range in difference may be set randomly and appropriately.

At the step S24 (corresponding to the corresponding relationship correcting portion 53 and the clutch torque—operating amount correcting portion 60), the value Tc of the clutch torque corresponding to the clutch actuator operating amount Saa which has been controlled to be the target clutch torque Tr in the corresponding relationship between the clutch actuator operating amount Sa and the clutch torque Tc is replaced with the presumed clutch torque after correction Tesns and the value is memorized in the RAM to correct the map shown in FIG. 3. It is noted that the replacing presumed clutch torque after correction Tesns may be the average value of the presumed clutch torque after correction Tesns (d1) through Tesns (d3) or the median value thereof. Further, such value may be any one of the values of Tesns (d1) through Tesns (d3). Then the corresponding relationship between the clutch actuator operating amount Sa and the clutch torque Tc is controlled by the corrected map for the following controls.

As explained from the description of the above embodiment, as a learning condition, the AMT 13 is in speed change operation, the completion of the speed change operation is detected by the speed change operation completion detecting portion 58, the clutch device 30 is under engaging state and the difference (absolute value |Ne−Ni|) between the engine rotation speed Ne and the input shaft rotation speed Ni of the AMT 13 is confirmed to be equal to or more than a predetermined value by the judgment of the rotation difference judging portion 59. Under such condition, the engine torque Te is obtained based on the throttle opening degree at this time (engine output control operating amount) and the engine rotation speed at this throttle opening degree.

The presumed clutch torque calculating portion 39 calculates the presumed clutch torque Tes which is a presumed value of the clutch torque Tc actually outputted when the clutch control portion 52 controls the clutch torque Tc to be the target clutch torque Tr from the obtained engine torque Te. Thereafter, the clutch torque—operating amount correcting portion 60 replaces the clutch torque value which corresponds to the clutch actuator operating amount Saa which has been controlled to be the target clutch torque Tr in the corresponding relationship between the clutch actuator operating amount Sa memorized in the clutch torque—operating amount memory portion 51 with the presumed clutch torque Tes for correction.

While the AMT 13 is under a speed change operation, when the speed change operation is completed and the clutch device 30 is in engaging state, if the difference in absolute value |Ne−Ni| between the engine rotation speed Ne and the input shaft rotation speed Ni of the AMT 13 is equal to or more than the predetermined value, the learning of the clutch torque after correction based on the presumed clutch torque Tes under the engine torque Te being applied to the clutch device 30 under engagement can be sufficiently carried out.

Further, as explained, the presumed clutch torque correcting portion 57 corrects the presumed clutch torque Tes calculated by the presumed clutch torque calculating portion 39 in response to the values of the engine rotation speed Ne and the input shaft rotation speed Ni. This can improve the accuracy of clutch torque calculation result and accordingly the correction accuracy is improved. In this embodiment, the presumed clutch torque correcting portion 57 utilizes both engine rotation speed Ne and input shaft rotation speed Ni, however, the invention is not limited to this method, but only one of the engine rotation speed Ne and input shaft rotation speed Ni may be used for correction. It may also be said that the correction by the presumed clutch torque correcting portion 57 may use neither one of the engine rotation speed Ne and input shaft rotation speed Ni to obtain sufficient effect of the invention.

According to the embodiment of the invention, the gradual decrease of the difference in absolute value |Ne−Ni| can be detected by the detection of the rotation difference change amount detecting portion 48 that the change ratio of the difference of absolute value is equal to or less than a predetermined value under the engine torque Te being applied to the clutch device 30. Under the change ratio of the difference (differential value) being less than the predetermined value, or under the clutch device 30 engagement state being gradually changed, the learning is carried out to obtain a stable and accurate data as similar to the learning at the start of the vehicle.

According to the embodiment, when the presumed clutch torque after correction Tesns corrected in response to the input shaft rotation speed Ni is equal to or more than the predetermined value, the value of the clutch torque after correction Tesns at a plurality of points (in this embodiment three points) is memorized and used for correction. According to this structure, since the data of the presumed clutch torque after correction Tesns can be a data with a smaller range where the change amount of the clutch actuator operating amount Sa relative to the change amount of the clutch torque Tc is relatively small in the corresponding relationship between the clutch actuator operating amount Sa and the clutch torque Tc to obtain a learning result with small deviation and stable performance. Further, if the difference of the presumed clutch torque after correction Tesns at plurality of points (three points) is below the predetermined value, the clutch torque—operating amount correcting portion 60 corrects the clutch actuator operating amount Sa corresponding to the clutch torque Tc. Thus, the data of the presumed clutch torque after correction can be obtained under a stable state to accurately correct the operating amount value Sa.

Further, the hybrid vehicle 1 according to the embodiment of the invention, the clutch device 30 connects the output shaft 31 of the engine 11 engageably with or disengageably from the input shaft 34 of the AMT 13 and the MG 12 is rotatably connected to the output shaft 35 of the AMT 13 and at the same time rotatably connected to the drive wheels 26a and 16b through the respective drive shafts 15a and 15b. This is so-called a parallel type hybrid vehicle. According to thus structured hybrid vehicle 1, the vehicle 1 can be driven and started only by the driving force of the MG 12. Under such starting, the opportunity for learning the clutch actuator operating amount Sa at the start of the vehicle becomes few. However, according to the embodiment of the invention, such opportunity of learning the clutch actuator operating amount can be increased under a certain condition upon a speed change operation and accordingly, the speed change operation under a stable condition can be performed by suitably correcting the corresponding relationship between the clutch actuator operating amount Sa and the clutch torque Tc memorized in the clutch torque—actuator operating amount memory portion 51.

It is noted that in the step S23 in the flowchart, the judging step is provided for judging whether or not the value difference (range difference) of the presumed clutch torque after correction Tesns (di) through (d3) obtained and memorized in the step S23 is equal to or less than the predetermined value. However, this step S23 can be omitted and yet a sufficient effect of the invention can be expected without the step S23. Under such changed state, the steps S11 and S2o through 23 may be also omitted from the flowchart in FIG. 7. Further, the step S15 (corresponding to the rotation difference change detecting portion 48) may be also omitted and yet a sufficient effect can be expected.

According to the embodiment, the presumed clutch torque Tes is corrected in response to the engine rotation speed Ne and the input shaft rotation speed Ni at the steps S17 and S18 (corresponding to the presumed clutch torque correcting portion 57). However, the invention is not limited to this embodiment and instead, the presumed clutch torque Tes is corrected by using a correction factor obtained from each rotation speed in response to the rotation difference absolute value |Ne−Ni|.

Further, according to the embodiment, as the case that the absolute value |Ne−Ni| between the input shaft rotation speed Ni and the engine rotation speed Ne, the up-shifting operation of the low speed stage (from the first speed stage to the second speed stage) has been explained. However, the invention is not limited to this case and as another example of the invention, up-shifting from the high speed stage, such as, the fourth speed stage (from the fourth speed stage to the fifth speed stage (this speed change ratio is about 70% of the fourth speed stage) can satisfy the condition and the invention can be applied to this up-shifting operation.

In other words, when the input shaft rotation speed Ni4 at the fourth speed stage is for example, 7000 rpm which is a high rotation speed, the up-shifted fifth speed stage exhibits the input shaft rotation speed Ni5 of 4900 rpm (=7000 rpm× 0.7). Accordingly, after up-shifting operation to the fifth speed stage, if the engine rotation speed Ne at the clutch device 30 starting engagement operation is approximately the same rotation speed Ne at the fourth speed stage, the absolute value |Ne−Ni| between the input shaft rotation speed Ni5 at the fifth speed stage and the engine rotation speed Ne at the start of engagement operation by the clutch device 30 is about 2100 rpm. Since this value exceeds the predetermined value of 2000 rpm and the data suitable for learning can be obtained.

Figure 8:
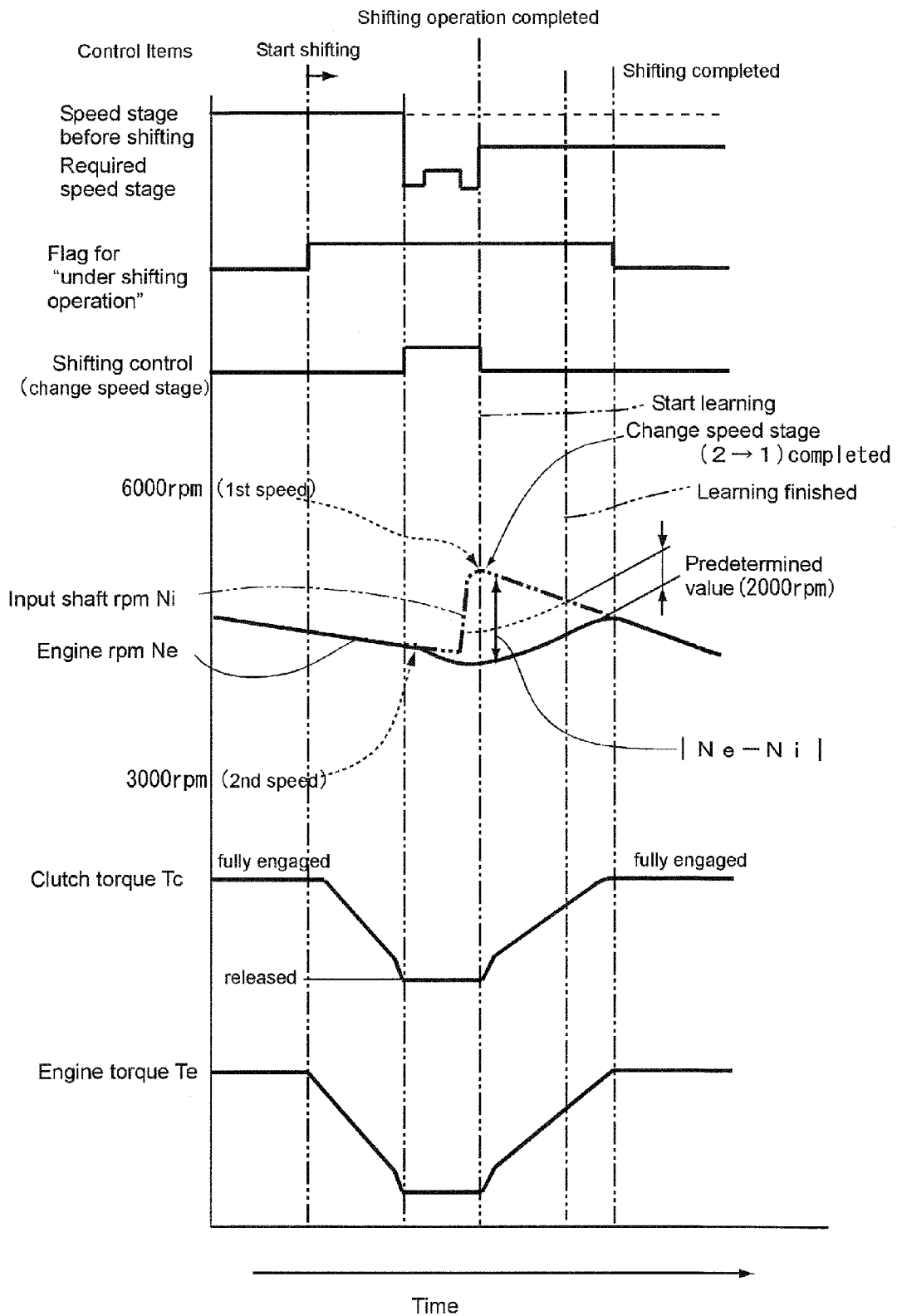
FIG. 8 is a time chart showing control states of engine rotation speed Ne and input shaft rotation speed Ni upon presumed torque learning at a different situation (deceleration) associated with another embodiment of the invention.

Further, as another embodiment, the control state as shown in FIG. 8, if the operator of the vehicle releases the acceleration pedal with an intention of deceleration and the AMT 13 is down-shifted from the second speed stage (one speed stage) to the first speed stage (another speed stage: the speed change ratio is twice as much as the ratio of the first speed stage), a large difference absolute value |Ne−Ni| between a large input shaft rotation speed Ni1 and the engine rotation speed Ne, which is a condition of carrying out the learning, can be obtained.

By changing the speed change ratio from the second speed stage to the first speed stage, the input shaft rotation speed Ni1 becomes approximately twice as much as the input shaft rotation speed Ni2. Accordingly, when the hybrid vehicle 1 running with the second speed stage under the input shaft rotation speed Ni2 of about 3000 rpm (vehicle speed of 45 km/h), if the AMT 13 is down-shifted to the first speed stage, the input shaft rotation speed Ni1 becomes the twice as much of approximately 6000 rpm (vehicle speed of 45 km/h) (See two-dotted line in FIG. 8). When the clutch device 30 starts to re-engagement operation, the engine rotation speed Ne is controlled to be low by the speed corresponding to the acceleration pedal releasing, relative to the engine rotation speed Ne running under the second speed stage and the absolute value |Ne−Ni| between the input shaft rotation speed Ni2 and the engine rotation speed Ne exceeds 3000 rpm which largely exceeds the predetermined value of 2000 rpm. Accordingly, the learning can be suitably carried out to obtain the data suitably. The engine rotation speed at this time is dragged by the input shaft rotation and is applied to the clutch device 30 as a negative torque. Thus the clutch device 30 is suitably in engagement state and the learning can be carried out to have the presumed clutch torque Tes at the time to be the clutch torque after correction.

As including the embodiments explained above, under other various situations, when the transmission is in speed change operation and the clutch is in engagement state, the absolute value |Ne−Ni| between the input shaft rotation speed Ni and the engine rotation speed Ne is obtained and when the obtained absolute value |Ne−Ni| is equal to or more than the predetermined value, the opportunity of learning can be suitably increased.

Figure 7:
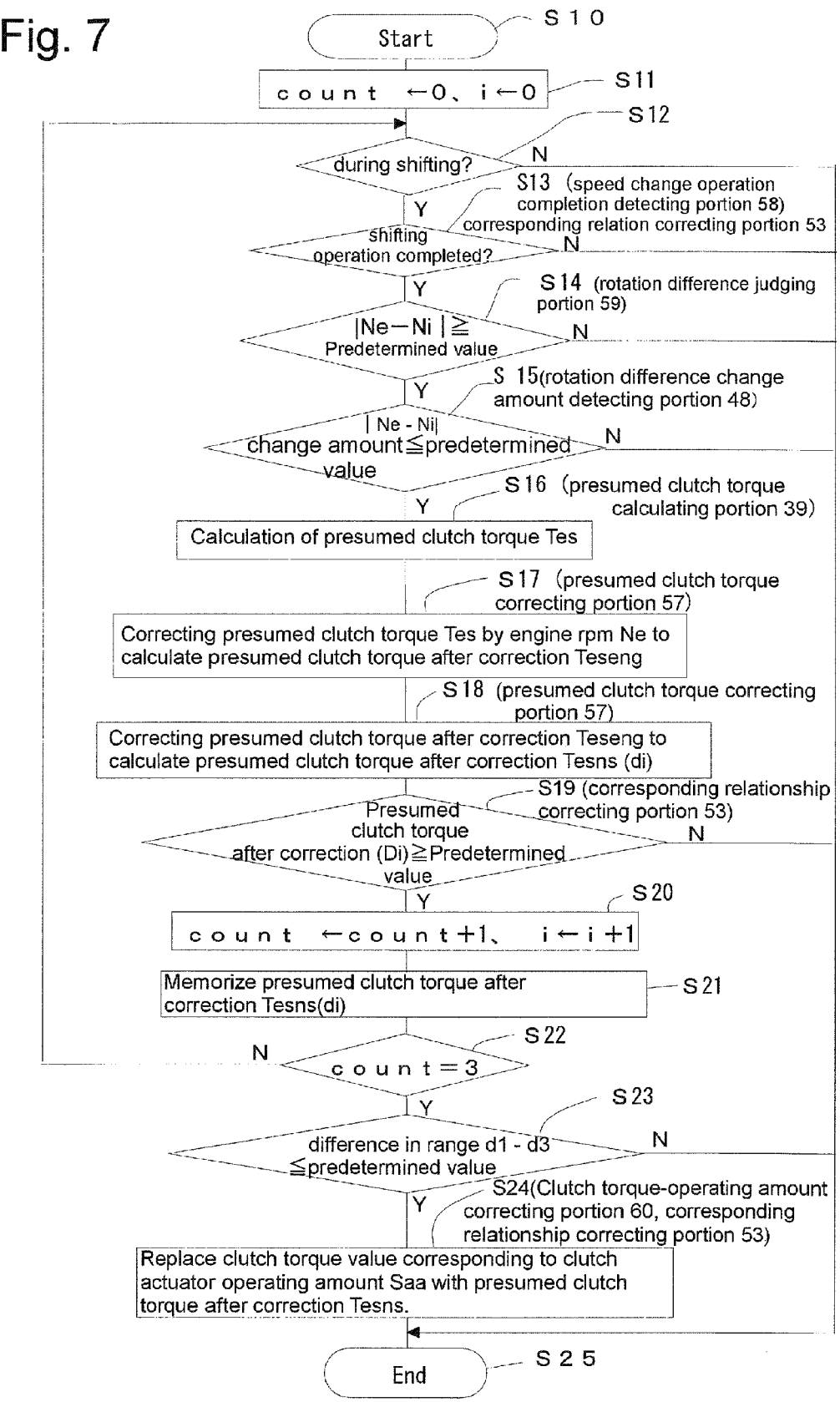
FIG. 7 is a flow chart associated with the embodiment of the invention.

As indicated in the flowchart in FIG. 7 at the step S14, the absolute value |Ne−Ni| is first obtained and when the obtained value |Ne−Ni| is equal to or more than the predetermined value, the processing after the step S15 is executed. However, the invention is not limited to this embodiment, first at the step S14 only the difference value |Ne−Ni| is obtained and the control of the steps S 15 through S18 is repeatedly executed throughout the speed change operation. Thus obtained all data corresponding to the values |Ne−Ni| obtained at the step S14 are memorized. Then after the clutch device 30 has completed the engagement operation after the speed change operation has been completed, only the absolute values which exceed the predetermined value are extracted from the all memorized data corresponding to the absolute values and the controls after the step S19 are executed to correct the map. This method also can expect the effect of the invention.

According to the embodiment, the hybrid vehicle 1 has the engine 11 and the MG 12 in parallel with each other and the engine 11 and the MG 12 dependently drive the vehicle. However, the invention is not limited to this hybrid type vehicle, but also is applicable to the vehicle which includes the engine and the MG in series and the driving force from the MG is transmitted to the differential gear device 14 or is applicable to a normal type vehicle having only the engine. Further, the transmission is not limited to the AMT but also is applicable to the converter clutch for learning control.

INDUSTRIAL APPLICABILITY OF THE INVENTION

This invention is applicable to a transmission of a hybrid vehicle which has less opportunity of learning the corresponding relationship between the clutch actuator operating amount and the clutch torque for controlling the clutch torque.

The gear shifting control device 2 for a hybrid vehicle 1 according to a first aspect of the embodiment of the invention includes an automated manual transmission (AMT) 13 which transmits a rotation of an input shaft 34 adapted to be rotated by an engine torque outputted from an engine 11 mounted on the hybrid vehicle to an output shaft 35 rotatably connected to a drive wheel 16*a*, 16*b* of the vehicle by changing a speed of the rotation from one speed change ratio (first speed stage) to another speed change ratio (second speed stage) when an engine rotation speed Ne of the engine 11 goes over each speed change performance line (A) prepared per each speed change ratio for a plurality of speed change stages (1-5, R), a clutch device 30 for engaging the output shaft 31 of the engine with the input shaft 34 of the automated manual transmission 13 or disengaging the output shaft 31 of the engine from the input shaft 34 of the automated manual transmission 13 and controlling a clutch torque Tc transmitted to the input shaft of the automated manual transmission from the output shaft of the engine under an engagement state therebetween to be a target clutch torque Tr by operation of a clutch actuator 17, a clutch torque—operating amount memory portion 51 for memorizing a corresponding relationship between a clutch actuator operating amount Sa of the clutch actuator 17 which controls the clutch torque of the clutch device 30 and the clutch torque, a clutch control portion 52 for controlling the clutch torque Tc to the target clutch torque Tr by obtaining the clutch actuator operating amount Sa of the clutch actuator 17 which corresponds to a predetermined target clutch torque from the clutch torque-operating amount memory portion 51 and operating the clutch actuator by the clutch actuator operating amount Sac, an engine rotation speed detecting portion 37 for detecting the engine rotation speed of the engine, an engine output control operating amount detecting portion 55 for detecting an engine operating amount (throttle opening degree) of an engine output control portion 49 for controlling an output of the engine, an engine torque detecting portion 56 for calculating an engine torque Te from the engine operating amount (throttle opening degree) of the engine output control portion detected by the engine output control operating amount detecting portion 55 and the engine rotation speed detected by the engine rotation speed detecting portion 54 based on a relationship between the engine rotation speed Ne and the engine torque Te at each engine operating amount of the engine output control portion 49, a presumed clutch torque calculating portion 39 for calculating a presumed clutch torque Tes by subtracting an inertia torque which is obtained by multiplying a rotation inertia moment with an acceleration speed of the engine rotation speed from the engine torque calculated from the engine output control operating amount and the engine rotation speed by the engine torque detecting portion 56 when the clutch control portion 52 operates the clutch actuator 17 to operate by a clutch actuator operating amount Saa corresponding to the target clutch torque Tr, a corresponding relationship correcting portion 53 for correcting a corresponding relationship between the clutch actuator operating amount memorized in the clutch torque—operating amount memory portion 51 and the clutch torque by learning the relationship between the presumed clutch torque Tes calculated by the presumed clutch torque calculating portion 39 and the clutch actuator operating amount when the clutch actuator is operated, an input shaft rotation speed detecting portion 37 for detecting an input shaft rotation speed of the input shaft 34 of the automated manual transmission 13 and a motor rotatably connected to the input shaft or output shaft of the automated manual transmission. The corresponding relationship correcting portion 53 includes a speed change operation completion detecting portion 58 for detecting that the speed change operation is completed upon speed change operation of the automated manual transmission, a rotation difference judging portion 59 for judging that an absolute difference |Ne−Ni| between the engine rotation speed Ne and the input shaft rotation speed Ni of the automated manual transmission is equal to or more than a predetermined value 2000 rpm under the clutch device 30 being engaged and a clutch torque-operating amount correcting portion 60 for replacing a value of clutch torque corresponding to the clutch actuator operating amount Saa which corresponds to the target clutch torque Tr operated by the clutch actuator by the clutch control portion with the presumed clutch torque Tes calculated by the presumed clutch torque calculating portion 39.

According to the structure of the first aspect of the embodiment above, as a condition of learning, under the clutch engaging state where the AMT 13 is under a speed change operation and the completion of the speed change operation is detected by the speed change operation completion detecting portion 58 and the clutch device 30 becomes in gradually engaged and finally in completely engaged state from the disengaged state, when the rotation difference judging portion 59 judges that the absolute value |Ne−Ni| of difference between the engine rotation speed Ne and the input shaft rotation speed Ni of the AMT 13 is equal to or more than a predetermined value 2000 rpm, the engine torque at this time can be obtained based on the engine output control amount (throttle opening degree) and the engine rotation speed by the engine torque detecting portion 56. Then the presumed clutch torque calculating portion 39 calculates a presumed clutch torque Tes which corresponds to a presumed value of the clutch torque actually outputted when the clutch torque is controlled to be a target clutch torque Tr by the clutch control portion 52 based on the obtained engine torque. Thereafter, the clutch torque-operating amount correcting portion 60 replaces a value of clutch torque corresponding to the clutch actuator operating amount which corresponds to the target clutch torque Tr operated by the clutch actuator 17 by the clutch control portion 52 with the presumed clutch torque calculated by the presumed clutch torque calculating portion 39. As explained, when the clutch is in engaging state after the speed change operation has been completed under a speed changing operation, if the absolute value |Ne−Ni| of difference between the engine rotation speed and the input shaft rotation speed of the AMT is equal to or more than a predetermined value, a learning that the clutch torque is corrected based on the presumed clutch torque can be sufficiently carried out under the engine torque being applied to the clutch.

The gear-shifting control device 2 for the hybrid vehicle 1 according to a second aspect of the embodiment of the invention is characterized in that the gear-shifting control device further includes a presumed clutch torque correcting portion 57 for correcting the presumed clutch torque Tes calculated by the presumed clutch torque calculating portion corresponding to at least one of the engine rotation speed Ne and the input shaft rotation speed Ni.

According to the above second aspect of the embodiment, the gear-shifting control device for a hybrid vehicle includes a presumed clutch torque correcting portion 57 for correcting the presumed clutch torque Tes calculated by the presumed clutch torque calculating portion 39 corresponding to at least one of the engine rotation speed and the input shaft rotation speed. The engine rotation speed clutch torque correction means a clutch torque correction in which an inertia moment part which changes the clutch torque generated at a portion on which a clutch pressing load is applied in proportion to the engine rotation speed is corrected and on the other hand the input shaft rotation speed clutch torque correction means a variation portion correction of the clutch torque generated by the rotation of the input shaft per se in proportion to the input shaft rotation speed. Thus, the presumed clutch torque calculation is further improved to improve the correction accuracy thereof.

The gear-shifting control device for the hybrid vehicle according to third aspect of the embodiment of the invention further includes a rotation difference change amount detecting portion 48 for detecting that the absolute value |Ne−Ni| of the difference is equal to or less than a predetermined value.

According to the third aspect of the embodiment above, the gradual change of the clutch engaging state is confirmed by detecting the change ratio of the absolute value of the difference to be equal to or less than the predetermined value by the rotation difference change amount (differential value) by the rotation difference change amount detecting portion. Accordingly, the learning is timely made at the timing that the absolute value of the detected difference is gradually decreased. Thus, a stable learning can be made similar to the time of engine starting.

In the gear-shifting control device for the hybrid vehicle according the fourth aspect of the embodiment of the invention, when the absolute value of the difference is equal to or less than a predetermined value, the presumed clutch torque calculating portion 39 calculates the presumed clutch torque.

According to the above fourth aspect of the embodiment, when the absolute value of the difference is equal to or less than a predetermined value, the presumed clutch torque calculating portion 39 calculates the presumed clutch torque. Thus, learning can be made under a stable state and the accurate data can be obtained.

The gear-shifting control device for the hybrid vehicle according to fifth aspect of the embodiment of the invention, the corresponding relationship correcting portion 53 memorizes presumed clutch torque after correction Tesns at a plurality of points when the presumed clutch torque after correction corrected by the input shaft rotation speed by the presumed clutch torque correcting portion 57 is equal to or more than a predetermined value.

According to the fifth aspect of the embodiment above, the corresponding relationship correcting portion 53 memorizes and utilizes the presumed clutch torque after correction Tesns at a plurality of points when the presumed clutch torque after correction corrected by the input shaft rotation speed by the presumed clutch torque correcting portion 57 is equal to or more than a predetermined value. Thus, the presumed clutch torque after correction can be a data in a range wherein regarding to the corresponding relationship between the clutch actuator operating amount and the clutch torque, a change amount of the clutch actuator operating amount relative to a change amount of the clutch torque is relatively small. This can result in obtaining less deviated learning results.

The gear-shifting control device for the hybrid vehicle according to the sixth aspect of the embodiment of the invention is characterized in that the clutch torque-operating amount correcting portion 60 corrects the value of clutch torque corresponding to the clutch actuator operating amount when the presumed clutch torque after correction at the plurality of points is equal to or less than a predetermined value.

According to the sixth aspect of the embodiment above, the clutch torque-operating amount correcting portion 60 corrects the value of clutch torque corresponding to the clutch actuator operating amount when the presumed clutch torque after correction at the plurality of points is equal to or less than a predetermined value. Thus, an accurate and stable correction can be performed by the presumed clutch torque after correction obtained under a stable condition.

The gear-shifting control device for the hybrid vehicle according to the seventh aspect of the embodiment is characterized in that the clutch device 30 connects or disconnects the output shaft 31 of the engine and the input shaft 34 of the automated manual transmission through engagement or disengagement operation and the motor is rotatably connected to the output shaft of the automated manual transmission and at the same time rotatably connected to the drive wheel through motor reduction gear ratio.

According to the seventh aspect of the embodiment above, the clutch device 30 connects or disconnects the output shaft 31 of the engine and the input shaft 34 of the automated manual transmission 13 through engagement or disengagement operation and the motor is rotatably connected to the output shaft of the automated manual transmission and at the same time rotatably connected to the drive wheel through motor reduction gear ratio. This hybrid is a so-called parallel type hybrid vehicle and according to the arrangement of this type, since the vehicle can be started only by the driving force of the motor/generator, the opportunities for learning may be reduced regarding to clutch actuator operating amount upon start of the vehicle. However, according to this aspect of the invention, the number of opportunities for learning the clutch actuator operating amount can be increased at the speed change operation under various conditions. Therefore, a stable speed change controlling can be performed by appropriately correcting the corresponding relationship between the clutch actuator operating amount and the clutch torque memorized in the clutch torque-operating amount memory portion.

IN THE DRAWINGS:

1: hybrid vehicle, 2: gear shifting control device, 11: engine, 12: motor/generator (MG), 13: automated manual transmission (AMT), 17: clutch actuator, 18: shift actuator, 21: HV/ECU, 22: MG/ECU, 23: ENG/ECU, 24: AMT/ECU, 26: select actuator, 30: clutch (clutch device), 31: output shaft (engine output shaft), 34: input shaft of AMT, 35: output shaft of AMT, 36: input shaft rotation speed sensor, 37: input shaft rotation speed detecting portion, 39: presumed clutch torque calculating portion, 48: rotation difference change amount detecting portion, 49: engine output control portion, 51: clutch torque—operating amount memory portion, 52: clutch control portion, 53: corresponding relationship correcting portion, 54: engine rotation speed detecting portion, 55: engine output control operating amount detecting portion, 56: engine torque detecting portion, 57: presumed clutch torque correcting portion, 58: speed change operation completion detecting portion, 59: rotation difference judging portion, 60: clutch torque—operating amount correcting portion, 67: stroke sensor, 68: throttle sensor, 69: throttle actuator, 70: throttle valve, 72: engine rotation speed sensor, Ne: engine rotation speed (rpm), Tc: clutch torque, Te: engine torque, Tes: presumed clutch torque.

The invention claimed is:

1. A gear shifting control device for a hybrid vehicle comprising:
   an automated manual transmission which transmits a rotation of an input shaft adapted to be rotated by an engine torque outputted from an engine mounted on the hybrid vehicle to an output shaft rotatably connected to a drive wheel of the vehicle by changing a speed of the rotation from one speed change ratio to another speed change ratio when an engine rotation speed of the engine goes over each speed change performance line prepared per each speed change ratio for a plurality of speed change stages;
   a clutch for engaging the output shaft of the engine with the input shaft of the automated manual transmission or disengaging the output shaft of the engine from the input shaft of the automated manual transmission and controlling a clutch torque transmitted to the input shaft of the automated manual transmission from the output shaft of the engine under an engagement state therebetween to be a target clutch torque by operation of a clutch actuator;
   a clutch torque-operating amount memory portion for memorizing a corresponding relationship between a clutch actuator operating amount of the clutch actuator which controls the clutch torque of the clutch and the clutch torque;
   a clutch control portion for controlling the clutch torque to the target clutch torque by obtaining the clutch actuator operating amount of the clutch actuator which corresponds to a predetermined target clutch torque from the clutch torque-operating amount memory portion and operating the clutch actuator by the clutch actuator operating amount;
   an engine rotation speed detecting portion for detecting the engine rotation speed of the engine;
   an engine output control operating amount detecting portion for detecting an engine operating amount of an engine output control portion for controlling an output of the engine;
   an engine torque detecting portion for calculating an engine torque from the engine operating amount of the engine output control portion detected by the engine output control operating amount detecting portion and the engine rotation speed detected by the engine rotation speed detecting portion based on a relationship between the engine rotation speed and the engine torque at each engine operating amount of the engine output control portion;
   a presumed clutch torque calculating portion for calculating a presumed clutch torque by subtracting an inertia torque which is obtained by multiplying a rotation inertia moment with an acceleration speed of the engine rotation speed from the engine torque calculated from the engine output control operating amount and the engine rotation speed by the engine torque detecting portion when the clutch control portion operates the clutch actuator to operate by a clutch actuator operating amount corresponding to the target clutch torque;
   a corresponding relationship correcting portion for correcting a corresponding relationship between the clutch actuator operating amount memorized in the clutch torque—operating amount memory portion and the clutch torque by learning the relationship between the presumed clutch torque calculated by the presumed clutch torque calculating portion and the clutch actuator operating amount when the clutch actuator is operated;

an input shaft rotation speed detecting portion for detecting an input shaft rotation speed of the input shaft of the automated manual transmission; and a motor rotatably connected to the input shaft or output shaft of the automated manual transmission, wherein, the corresponding relationship correcting portion includes:

a speed change operation completion detecting portion for detecting that the speed change operation is completed upon speed change operation of the automated manual transmission;

a rotation difference judging portion for judging that an absolute difference between the engine rotation speed and the input shaft rotation speed of the automated manual transmission is equal to or more than a predetermined value under the clutch being engaged after a detection of completion of the speed change operation by the speed change operation completion detecting portion; and a clutch torque-operating amount correcting portion for replacing a value of clutch torque corresponding to the clutch actuator operating amount which corresponds to the target clutch torque operated by the clutch actuator by the clutch control portion with the presumed clutch torque calculated by the presumed clutch torque calculating portion under a condition that the speed change operation of the automated manual transmission is completed and the absolute difference is equal to or more than the predetermined value with the clutch being under engaging state.

2. The gear shifting control device for a hybrid vehicle according to claim 1, further including a presumed clutch torque correcting portion for correcting the presumed clutch torque calculated by the presumed clutch torque calculating portion corresponding to at least one of the engine rotation speed and the input shaft rotation speed.

3. The gear shifting control device for a hybrid vehicle according to claim 1, further comprising a rotation difference change amount detecting portion for detecting that the absolute value of the difference is equal to or less than a predetermined value.

4. The gear shifting control device for the hybrid vehicle according to claim 3, wherein when the absolute value of the difference is equal to or less than the predetermined value, the presumed clutch torque calculating portion calculates the presumed clutch torque.

5. The gear shifting control device for the hybrid vehicle according to claim 1, wherein the corresponding relationship correcting portion memorizes presumed clutch torque after correction at a plurality of points when the presumed clutch torque after correction corrected by the input shaft rotation speed by the presumed clutch torque correcting portion is equal to or more than a predetermined value.

6. The gear shifting control device for the hybrid vehicle according to claim 5, wherein the clutch torque operating amount correcting portion corrects the value of clutch torque corresponding to the clutch actuator operating amount when the presumed clutch torque after correction at the plurality of points is equal to or less than the predetermined value.

7. The gear shifting control device for the hybrid vehicle according to claim 1, wherein the clutch connects or disconnects the output shaft of the engine and the input shaft of the automated manual transmission through engagement or disengagement operation and the motor is rotatably connected to the output shaft of the automated manual transmission and rotatably connected as well to the drive wheel through motor reduction gear ratio.

8. The gear shifting control device for a hybrid vehicle according to claim 1, wherein the speed change operation completion detecting portion detects the completion of the speed change operation by detecting a changing of the speed stage in the automated manual transmission by receiving a signal from the automated manual transmission.

9. The gear shifting control device for a hybrid vehicle according to claim 8, wherein the clutch torque-operating amount memory portion memorizes the corresponding relationship in a memory and the clutch torque-operating amount correcting portion memorizes the replaced presumed clutch torque in the memory.

* * * * *